United States Patent
Hong et al.

(10) Patent No.: US 7,141,329 B2
(45) Date of Patent: Nov. 28, 2006

(54) ELECTRODE HAVING MICROSTRUCTURE OF EXTENDED TRIPLE PHASE BOUNDARY BY POROUS ION CONDUCTIVE CERIA FILM COATING AND METHOD TO MANUFACTURE THE SAID ELECTRODE

(75) Inventors: Seong-Ahn Hong, Seoul (KR); In-Hwan Oh, Seoul (KR); Tae-Hoon Lim, Seoul (KR); Suk-Woo Nam, Seoul (KR); Heung-Yong Ha, Seoul (KR); Sung Pil Yoon, Seoul (KR); Jonghee Han, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 512 days.

(21) Appl. No.: 10/158,857

(22) Filed: Jun. 3, 2002

(65) Prior Publication Data

US 2003/0082436 A1    May 1, 2003

(30) Foreign Application Priority Data

Nov. 1, 2001    (KR) ............................... 2001-67920

(51) Int. Cl.
*H01M 4/86* (2006.01)
*H01M 4/88* (2006.01)

(52) U.S. Cl. .......................... 429/44; 429/45; 429/41; 429/40; 429/30; 502/101

(58) Field of Classification Search ................. 429/44, 429/45, 41, 40, 30; 502/101
See application file for complete search history.

(56) References Cited

U.S. PATENT DOCUMENTS 4,812,329 A * 3/1989 Isenberg .................... 427/115
5,543,239 A    8/1996 Virkar et al.

(Continued)

FOREIGN PATENT DOCUMENTS

| JP | 2 38362 | 2/1990 |
|---|---|---|
| JP | 6 283179 | 10/1994 |

OTHER PUBLICATIONS

Yoon et al., Improved performance of La0.35Sr0.15MnO3 cathodes by sol-gel coatings, Jun. 3-8, 2001, Seventh International Symposium in Tsukuba Japan, Electrochemical Society Proceedings, vol. 2001-16, pp. 485-491.*

(Continued)

*Primary Examiner*—Patrick Joseph Ryan
*Assistant Examiner*—Angela J. Martin
(74) *Attorney, Agent, or Firm*—Browdy and Neimark, PLLC (57) ABSTRACT

Disclosed is an electrode having a novel configuration for improving performance of the electrode used in solid-oxide fuel cells, sensors and solid state devices, in which the electrode providing electron conductivity is coated with ion conductive ceramic ceria film, enabling an electron conductive path and an ion conductive path to be independently and continuously maintained, and additionally extending a triple phase boundary where electrode/electrolyte/gas are in contact, and a method for manufacturing the same. The electrode is manufactured by coating the prefabricated electrode for use in a SOFC or sensor with a porous oxygen ion conductive ceramic ceria film by a sol-gel method, whereby the electron conductive material and ion conductive material exist independently, having a new microstructure configuration with a greatly extended triple phase boundary, thus improving electrode performance. Accordingly, such electrode does not require high cost equipment or starting materials, owing to the sol-gel method by which low temperature processes are possible. Moreover, the electrode microstructure can be controlled in an easy manner, realizing economic benefits, and the electrode/electrolyte interfacial resistance and electrode resistance can be effectively decreased, thereby improving performance of electrodes used in SOFCs, sensors and solid state devices.

8 Claims, 5 Drawing Sheets

U.S. PATENT DOCUMENTS

| | | |
|---|---|---|
| 5,937,264 A | 8/1999 | Wallin |
| 5,993,986 A | 11/1999 | Wallin et al. |
| 5,993,988 A | 11/1999 | Ohara et al. |
| 6,017,647 A | 1/2000 | Wallin |

OTHER PUBLICATIONS

Dees et al., "Conductivity of Porous Ni/$ZrO_2$-$Y_2O_3$ Cermets", *J. Electrochem. Soc*, (1987), vol. 134, No. 9, pp. 2141-2146.

Mogensen et al., "Kinetic and geometric aspects of solid oxide fuel cell electrodes", *Solid State Ionics*, (1996), pp. 1151-1160.

Kenjo et al., "$LaMnO_3$ air cathodes containing $ZrO_2$ electrolyte for high temperature solid oxide fuel cells", *Solid State Ionics*, (1992), vol. 57, pp. 295-302.

Suzuki et al., "High Performance Solid Oxide Fuel Cell Cathode Fabricated by Electrochemical Vapor Deposition", *J. Electrochem. Soc.*, (1994), vol. 141, No. 7, pp. 1928-1931.

Tsai et al., "LSM-YSZ Cathodes for Medium-Temperature Solid Oxide Fuel Cells", *Electrochemical Proceedings*, (1997), vol. 97-18, pp. 368-377.

Mizusaki et al., "The $La_{0.6}Ca_{0.4}MnO_3$-YSZ Composite as an SOFC Air Electrode", *Denki Kangaku*, (1990), vol. 58, pp. 520-527.

M.J.L. Østergard et al., "ac Impedance Study of the Oxygen Reduction Mechanism on $La_{1-x}Sr_xMnO_3$ in solid Oxide Fuel Cells", *Electrochemica Acta*, (1993), vol. 38, pp. 2015-2020.

Kamata et al., "Oxygen Reduction Behaviour at the Co-Fired $La_{0.8}Sr_{0.2}MnO_3$/ YSZ Interface, as an SOFC Air Electrode", *European Solid Oxide Fuel Cell Forum eds. Ulf Bossel, Proceedings*, (1994), vol. 2, pp. 725-733.

Docuemnts for the seventh international symposium titled "Solid Oxided Fuel Cells VII" during Jun. 3-8, (2001), in Tsukuba Japan.

Documents for the Seventh Grove Fuel Cell Symposium titled "commercializing Fuel Cells: The Issues Outstanding" during Sep. 11-13 (2001) in London, United Kingdom.

* cited by examiner

ELECTRODE HAVING MICROSTRUCTURE OF EXTENDED TRIPLE PHASE BOUNDARY BY POROUS ION CONDUCTIVE CERIA FILM COATING AND METHOD TO MANUFACTURE THE SAID ELECTRODE

BACKGROUND OF THE INVENTION

1. Field of the Invention

The present invention relates to an electrode for use in solid-oxide fuel cells (referred to hereinafter as "SOFC"), sensors, solid state devices, and the like, in which the electrode is coated with ion conductive ceramic ceria film, extending a triple phase boundary where electrode/electrolyte/gas are in contact, thereby enhancing performance thereof, and a method for manufacturing the same. More particularly, the invention relates to a novel electrode in which a prefabricated electrode for use in a SOFC or sensor is coated with porous oxygen ion conductive ceramic ceria film by a sol-gel method, enabling an electron conductive path and an ion conductive path to be independently and continuously maintained, thereby solving an interconnection cut-off problem, enhancing electrode performance due to a great enlargement of triple phase boundary where electrode/electrolyte/gas are in contact, and further enabling the manufacture of the electrode at a lower temperature by employing a sol-gel method, resulting in preventing generation of undesired interfacial reaction products, and a method for manufacturing the same.

2. Description of the Related Art

In fabricating SOFCs, an electron conductive ceramic material, $La_{1-x}Sr_xMnO_3$ (referred to hereinafter as LSM) has been used as a cathode material (M. J. L. Ostergard and M. Mogensen, Electrochemica Acta. 38: 2015–2020, 1993; H. Kamata, A. Hosaka, Yuji Ikegami and J. Mizusaki, H. Tagawa, in first European Solid Oxide Fuel Cell Forum, eds. Ulf Bossel, Proceedings Vol. 2: 725–733, 1994). In a common method for manufacturing cathodes, an electron conductive material such as LSM, and an ion conductive material such as yttria-stabilized zirconia (referred to hereinafter as YSZ), that is, the electrolyte material, are mixed, considering a thermal expansion coefficient with an electrolyte, and the mixture is used to manufacture cathodes with high performance. Such cathodes are deposited on a dense electrolyte surface, which is made of an ion conductive solid oxide such as YSZ, fabricating a SOFC. Since the state-of-the-art SOFC now developed for a high capacity requires a high temperature of around 1000° C. for cell operation, there is a problem in that it is hard to find an interconnect material which is easy to process and is low in cost. In addition, such an SOFC has a disadvantage in that electrode particles are sintered upon long-term cell operation, decreasing an active area for reaction, thereby degrading cell performance (J. Mizusaki, H. Tagawa, K. Tsuneyoshi, A. Sawata, M. Katou, and K. Hirano, "The $La_{0.6}Ca_{0.4}MnO_3$ YSZ composite as an SOFC air electrode", *Denki Kangaku*, 58: 520–527, 1990). Accordingly, it is desired to lower temperatures for cell operation, and so many researchers have attempted to develop a low-temperature SOFC which operates at 500 to 800° C. Research to realize low operating temperatures in sensors and solid state devices is also actively underway. However, for general SOFCs, sensors and solid state devices which employ YSZ as the electrolyte and operate at 700 to 800° C., the cathode performance is so low, compared to anode performance, that it is necessary to improve the cathode performance.

Cathode performance of SOFCs is determined mainly depending on interfacial resistance, which is caused by generation of an interfacial reaction product such as $SrZrO_3$ or $La_2Zr_2O_7$ at a contact surface of the cathode with the YSZ electrolyte and on electrode polarization resistance, caused by electrochemical reactions occurring at the cathode. For this reason, improvement of cathode performance can be achieved by reducing those resistance values. Specially, as for a low-temperature SOFC which operates at 700 to 800° C., SOFC performance is considerably affected by electrode polarization resistance ($R_{el}$) according to a process of oxygen reduction at the cathode, and by interfacial resistance ($iR_{interface}$) between electrode and electrolyte (T. Tsai and S. A. Barnett, in Solid Oxide Fuel Cells V, eds. U. Stimming, S. C. Singhal, H. Tagawa and W Lehnert, The Electrochemical Society Proceedings Series PV 97–18, 368–375, 1997; M. Suzuki, H. Sasaki, S. Otoshi, A. Kajimura, N. Sugiura, and M. Ippommatsu, J. Electrochem. Soc. 141: 1928–1931, 1994). Thus, it is necessary for electrode polarization resistance at the cathode and interfacial resistance between the cathode and the electrolyte to be reduced, in order to manufacture a high performance SOFC.

A reaction ($\frac{1}{2}O_2 + 2e^- \rightarrow O^{2-}$) occurring at the cathode of a SOFC takes place mainly at the triple phase boundary in which the cathode, electrolyte and oxygen are in contact. The triple phase boundary is considerably affected by characteristics of a reaction occurring at a contact surface of the electrolyte and cathode. Therefore, it is desirable to form such a cathode/electrolyte interface where oxygen is diffused well and a contact area for the electrolyte and cathode is increased. As a result, resistance of the cathode/electrolyte interface is decreased, and also the area of triple phase boundary is increased, decreasing the electrode polarization resistance, thereby improving overall cathode performance. Methods for controlling microstructure of such a cathode to increase electrode performance include the following. One example is a two-dimensional method by which electrode powder with fine particles is well dispersed, thereby maximizing packing density in the electrode/electrolyte interface (M. Suzuki, H. Sasaki, S. Otoshi, A. Kajimura, N. Sugiura, and M. Ippommatsu, "High performance solid oxide fuel cell cathode fabricated by electrochemical vapor deposition", J. Electrochem. Soc., 141(7): 1928–1931, 1994). Another example is a three-dimensional method by which electrode reactions occur even at portions of the electrode distal from the electrolyte, as well as at the triple phase boundary (T. Kenjo and M. Nishiya, $LaMnO_3$ air cathodes containing $ZrO_2$ electrolyte for high temperature solid oxide fuel cells, *Solid State Ionics*, 57: 295–302, 1992). Although such a three-dimensional method is desirable for improvement of electrode performance, it is applicable only to a mixed conductor, or a composite conductor having both ion- and electron-conductive paths. Accordingly, widely used are methods for manufacturing electrodes including the step of mixing electrode powder (electron conductive material) and electrolyte powder (ion conductive material), forming interpenetrating microstructures, thereby increasing electrode performance (U.S. Pat. No. 5,543,239). Recent reports disclose methods of infiltrating electrocatalysts into those electrodes for increasing cell performance (U.S. Pat. No. 6,017,647).

The simplest method of increasing a contact area of the electrode/electrolyte interface is to control temperatures in assembling the electrode and the electrolyte. In the course of fabricating a general SOFC which employs YSZ as the electrolyte, the cathode material coats the surface of the electrolyte, followed by sintering at 1100 to 1400° C., thereby assembling the cathode and the electrolyte. However, if the cathode material containing LSM is assembled with the electrolyte at temperatures above 1200° C., an interfacial reaction product such as $SrZrO_3$ or $La_2Zr_2O_7$ is generated at the electrode/electrolyte interface, resulting in degradation of SOFC performance (M. Mogensen and Steen Skaarup, Solid State Ionics 86–88, 1151–1160, 1996). On the other hand, if the sintering temperature is lower than 1200° C., the assembling of the cathode and the electrolyte is not achieved in an easy manner, so the interfacial resistance between the cathode and electrolyte becomes severe, resulting in degradation of SOFC performance.

As mentioned above, there are now commonly used technologies for increasing the cathode/electrolyte contact area and the area of triple phase boundary, comprising the step of solid state mixing LSM powder and YSZ powder, and using the mixture to manufacture cathodes having inter-penetrating microstructures (T. Kenjo and M. Nishiya, Solid State Ionics 57: 295–302, 1992; U.S. Pat. Nos. 5,543, 239; 6,017,647). However, also in these cases, the temperature in assembling the electrode/electrolyte should be well controlled to fabricate high performance cells. That is, when assembling, an interfacial reaction product such as $SrZrO_3$ or $La_2Zr_2O_7$ is generated at the cathode/electrolyte interface, which degrades cell performance. In addition, where ion conductive powder and electron conductive powder are mixed, with an increase of the YSZ content, the electron conductive path may be broken, greatly increasing resistance, thereby causing an interconnection cut-off problem (D. W. Dees, T. D. Claar, T. E. Easler, D. C. Fee, and F. C. Mrazek, J. Electrochem. Soc. 134: 2141, 1987). Accordingly, where powder serving as an electron conductor is mixed with electrolyte powder to form an inter-penetrating microstructure, a minimum of a specific weight ratio or volume ratio of the electrolyte to the electrode must be employed to fabricate cells (U.S. Pat. Nos. 5,937,246; 5,993,988; and 6,017,647).

Virkar et al. proposed a new microstructure of an electrode where an electrochemical reaction is extended in a three-dimensional manner (U.S. Pat. No. 5,543,239). That is, an electrolyte is coated with slurry containing an electrolyte material, followed by thermal treatment, forming a porous electrolyte layer on the dense electrolyte. An electrocatalyst material serving as an electrode is infiltrated into the porous electrolyte layer. In such a way, the triple phase boundary is extended in a three-dimensional manner. This method, however, requires a high sintering temperature of approximately 1450° C. to assemble the dense electrolyte layer with the porous electrolyte layer formed thereon. In addition, there is a disadvantage in that if an electrocatalyst material serving as an electron conductor (that is, LSM, Pt, LSCF, etc) fails to sufficiently coat the entire porous electrolyte layer, internal resistance (IR) is considerably increased. Another disadvantage is that a low melting point of the perovskite-type material such as LSM or LSCF causes the electrode surface area to decrease upon long-term operation, decreasing the area for electrochemical reaction, thereby degrading cell performance. On the other hand, the microstructure of the electrode according to the invention, is formed by coating a porous electrode with a porous oxygen ion conductive film. This is in contrast to the method of Virkar et al., whose microstructure of the electrode is formed by coating the porous electrolyte with a porous electrode material. Advantageously, in accordance with the invention, a microstructure of the electrode is formed at lower temperatures using a sol-gel process. Further, the electrode having such a microstructure of extended triple phase boundary is able to prevent a surface area from being decreased due to the electrode sintering at high temperatures, while which is likely to be observed upon using Virkar's method, since the electrode and electrolyte are coated with an electrolyte material, such as Sm-doped ceria (SDC), which is harder to sinter than material.

Wallin et al. (U.S. Pat. Nos. 5,937,264; 5,993,986; and 6,017,647) reported that after manufacturing a cathode using a conventional method by which an electron conductive material and ion conductive material are mixed, the electrocatalyst in a solution state is then infiltrated into the cathode, thereby being capable of increasing electrode performance. However, this method has problems in that an interfacial reaction product is generated between the electron conductive material and the electrolyte and interconnection cut-off is caused, since the electron conductive material and ion-conductive material are mixed, forming the so-called interpenetrating networks.

Figure 1:
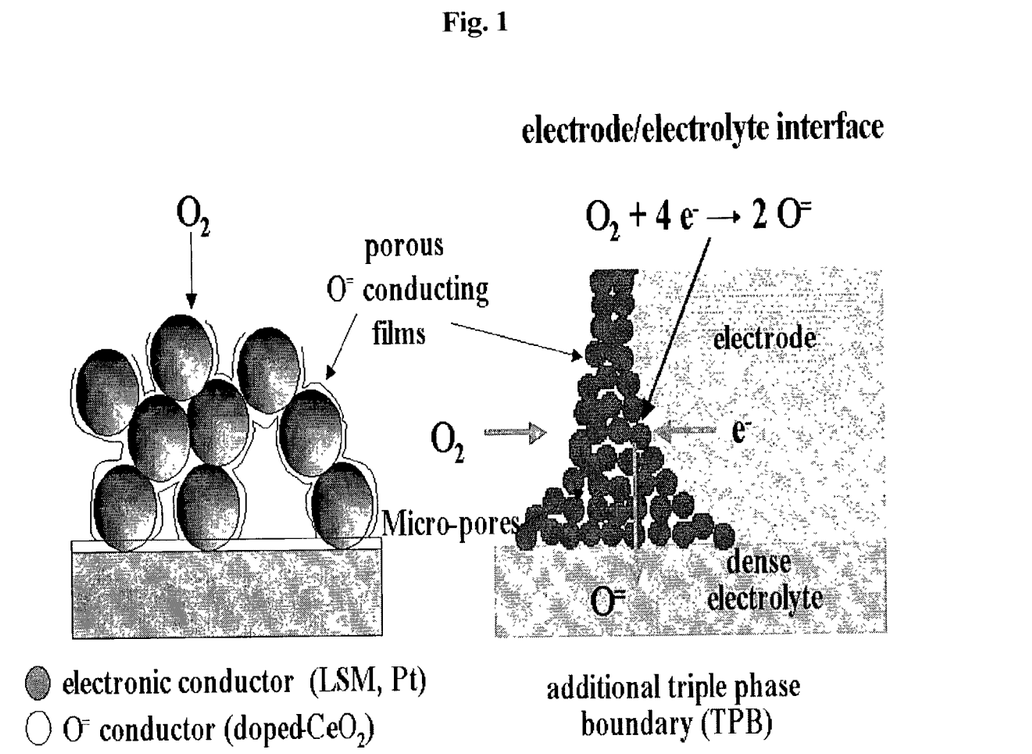
FIG. 1 illustrates a conceptual model showing an interfacial contact between electrolyte and electrodes, and an increase in triple phase boundary, according to the invention.
Figure 2A:
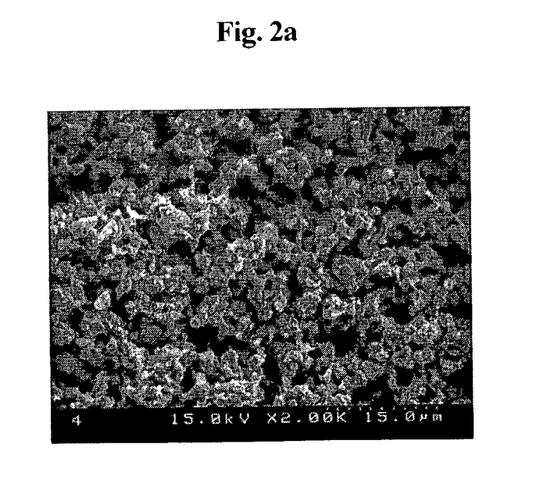
FIG. 2a is an SEM view of a surface of the electrode before SDC-coating.
Figure 2B:
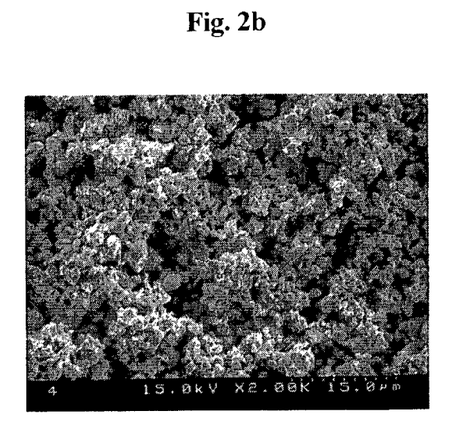
FIG. 2b is an SEM view of a surface of the electrode after SDC-coating.
Figure 2C:
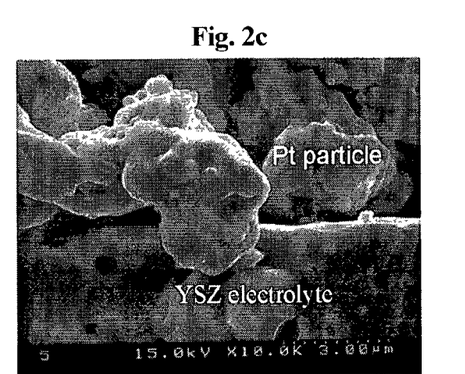
FIG. 2c is an SEM view of an interface of the electrode/electrolyte before SDC-coating.
Figure 2D:
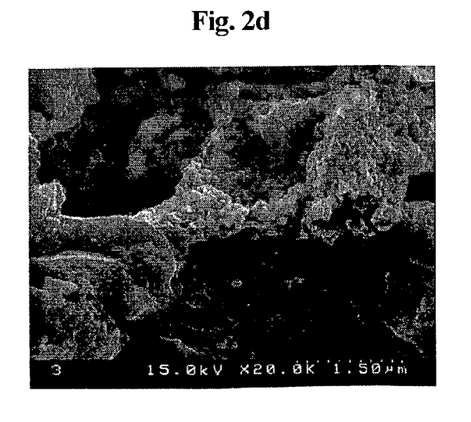
FIG. 2d is an SEM view of an interface of the electrode/electrolyte after SDC-coating.

Application of YSZ sol to SOFCs is disclosed in Japanese Pat. Nos. 06283179 and 02038362, and U.S. Pat. No. 5,993,988. In particular, Japanese Pat. Laid-open Publication No. Heisei 6-283179 discloses that YSZ slurry coats the support of the cathode or the anode, followed by thermal treatment. Cracks or pinholes caused by such thermal treatment may be filled up using YSZ sol, thereby forming the dense YSZ electrolyte thin film. On the other hand, in the invention, porous SDC film is formed on the electrode and electrolyte. As illustrated in FIG. 1, triple phase boundary of electrode/electrolyte/gas is continuously extended even to regions of the porous electrodes distal from the electrolyte, thereby decreasing electrode polarization. Thus, this approach is different from the above reference.

Ohara et al. (U.S. Pat. No. 5,993,988) teach that a solution of nickel acetate tetrahydrate is mixed with YSZ sol, followed by spray pyrolysis, preparing a composite powder whose NiO particles are surrounded by YSZ particles. The composite powder prepared by Ohara et al., may be used to prevent Ni particles from being sintered after reduction, owing to well-dispersed YSZ particles. This method is different from the method of forming a microstructure of the electrode of the present invention, as illustrated in FIG. 1. According to Ohara et al.'s method, the composite powder is prepared only when the amount of Ni:YSZ is in a specific range of 90:10 to 50:50 mole %. This is based on the fact, as mentioned above, that with an increase of the YSZ content, electron conductivity is greatly decreased, causing an interconnection cut-off problem. Moreover, the above method is based on the fact that YSZ particles partially cover Ni particles so Ni particles are prevented from being sintered by a pinning effect, but in this case the electron conductive path is broken, so the YSZ particles fail to form a continuous triple phase boundary. For this reason, Ohara's method cannot maximize performance of the electrode, while the present invention achieves maximized electrode performance.

SUMMARY OF THE INVENTION

Therefore, the present invention has been made in view of the above problems, and it is an object of the present invention to provide a novel electrode in which the electrode for solid oxide fuel cells, sensors, or solid state devices is coated with porous oxygen ion conductive ceramic ceria film by a sol-gel method, enabling an electron conductive path and an ion conductive path to be independently and continuously maintained, enhancing electrode performance due to a great extension of a triple phase boundary where electrode/electrolyte/gas are in contact, and further enabling the manufacture of the electrode at a lower temperature by employing a sol-gel method, resulting in preventing generation of undesired interfacial reaction products, and a method for manufacturing the same.

In accordance with the present invention, the above and other objects can be accomplished by the provision of an electrode having a microstructure of extended triple phase boundary with porous ion conductive ceria film coating wherein: an electrode for solid oxide fuel cells, sensors, or solid state devices, which is prefabricated to have independent electron and ion conductive paths, is coated with a porous oxygen ion conductive ceramic ceria film to provide a microstructure having an extended triple phase boundary where the electrode/electrolyte/gas are in contact; the electrode has a skeleton made of a material exhibiting electron conductivity or mixed conductivity; the coated film is made of a material exhibiting ion conductivity or mixed conductivity while surrounding the electrode and electrolyte without disconnecting the ion conductive path from a surface of the electrolyte; and the coated film forms gas-permeable pores or fine pores therein or at an interface thereof with the electrode to provide the triple phase boundary.

With regard to the electrode according to the invention, the porous oxygen ion conductive ceramic ceria film is made of one or more oxide sol selected from the group consisting of $CeO_2$ polymeric sol or particulate sol being 0 to 30% doped with Gd, $CeO_2$ polymeric sol or particulate sol being 0 to 30% doped with Sm, $CeO_2$ polymeric sol or particulate sol being 0 to 30% doped with Y, $CeO_2$ polymeric sol or particulate sol being 0 to 30% doped with Sr, $CeO_2$ polymeric sol or particulate sol being 0 to 30% doped with La, and $CeO_2$ polymeric sol or particulate sol being 0 to 30% doped with Ca.

With regard to the electrode according to the invention, the electrode material exhibiting electron conductivity is one or more metal or oxides selected from the group consisting of Pt, Ag, Au, Rh, Ir, Pd, Ru, $(La_{1-x}Sr_x)MnO_3$ in which x is 0.5 or less, $(La_{1-x}Ca_x)MnO_3$ in which x is 0.5 or less, $(La_{1-x}Sr_x)CoO_3$ in which x is 0.6 or less, and $(La_{1-x}Sr_x)(Co_{1-y})$ which x is 0.4 or less and y is 0.8 or less.

In accordance with another aspect of the present invention, there is provided a method for manufacturing the electrode having a microstructure of extended triple phase boundary according to the invention comprising the steps of: (a) coating a surface of dense electrolyte with electrodes made of a electron conductive material, followed by sintering and attaching, and preparing a electrode/electrolyte structure; (b) preparing ion conductive ceramic ceria polymeric sol or particulate sol; and (c) dip-coating ceria polymeric sol or particulate sol of the step (b) on the electrode/electrolyte structure of the step (a), using a sol-gel method, forming continuous porous ion conductive ceramic ceria film.

BRIEF DESCRIPTION OF THE DRAWINGS

The above and other objects, features and other advantages of the present invention will be more clearly understood from the following detailed description taken in conjunction with the accompanying drawings, in which:

FIGS. 2a to 2d are scanning electron micrograph (SEM) views showing ion conductive ceramic ceria coating film formed on the electrode/electrolyte structure, according to the invention:

DESCRIPTION OF THE PREFERRED EMBODIMENTS

FIG. 1 illustrates a conceptual model showing an interfacial contact between electrolyte and electrodes, and an increase in a triple phase boundary. The electron conductive material was applied to coat the surface of a dense electrolyte using a wet process. After coating, an electron conductive material was first attached on the substrate at a temperature where an interfacial reaction product is not generated, for example, as for LSM, at 1100° C. for 2 hrs, and then sol made of an oxygen ion conductive material, for example, SDC, was applied to coat the electrodes and electrolyte. As shown in FIG. 1, such a method offers an effect of greatly increasing a triple phase boundary where the electrode/electrolyte/gas are in contact, and an electrochemical reaction occurs. In addition, the electron conductive path and ion conductive path are, as shown in FIG. 1, independently and continuously maintained. As a result, upon addition of an ion conductive substance, an interconnection cut-off problem was not caused, and an unstable attaching ability of the electrodes could be overcome by forming the coating film even at lower temperatures. To form such a structure of the electrodes, three conditions must be met: first, the electrode skeleton should be made of a material exhibiting electron conductivity or mixed conductivity; second, the coating film should exhibit ionic conductivity or mixed conductivity, and a broken ion conductive path from the triple phase boundary of the electrode/electrolyte structure should not occur; and third, the coating film should have pores capable of providing a triple phase boundary.

In general, as a particle size of ceramic powder is decreased, the surface area of the powder is increased and the sintering property is improved. Accordingly, a sol solution in which ceramic with fine particles is dispersed can be prepared, and using the sol, oxygen ion conductive ceramic coating film may be formed on the electrode/electrolyte structure, whereby the contact area of the electrode/electrolyte structure increases, thus decreasing interfacial resistance. Moreover, the area of triple phase boundary where the electrode, electrolyte and reaction gas are in contact is additionally extended, thereby improving electrode performance.

Using SDC sol according to the invention, the oxygen ion conductive ceramic ceria film may be formed on the electrode/electrolyte structure, thereby extending the triple phase boundary. According to the method, electrode performance can be enhanced by using SDC sol suitable for forming SDC coating film on the electrode/electrolyte, as illustrated in FIG. 1. Oxygen ion conductive ceramic ceria film used in the invention is made of commercially available ceria sol (Alfa Co., USA) with 10 nm particle size, which is added with Sm salt to enhance oxygen ion conduction. SDC sol thus prepared is applied for dip coating the electrode, which is previously assembled with the YSZ electrolyte, forming SDC coating film on the electrode/electrolyte structure as shown in FIG. 1. That is, SDC sol prepared according to the invention is applied for repeated dip coating of a cell in which electron conductive electrodes such as LSM or Pt are attached. As a result, oxygen ion conductible coating film, having fine pores through which gas can transport, is formed on the electrode/electrolyte structure, thereby extending the triple phase boundary.

As shown in FIG. 1, according to the invention, the contact area of the electrode/electrolyte structure is increased, decreasing interfacial resistance. Also, the triple phase boundary where the electrode, electrolyte and reactive gas are in contact is increased, thereby increasing electrode performance.

EXAMPLE 1

Preparation of SDC Sol

First, 50 g ceria sol with a particle size of 10 nm (20 wt % in $H_2O$, Alfa AESAR, USA) was diluted in 100 g distilled water, preparing diluted sol. 6.45 g Sm nitrate hexahydrate ($Sm(NO_3)_3 \cdot 6H_2O$, 99.9%, Aldrich, USA) was dissolved in 50 g distilled water, preparing a Sm nitrate solution. To the diluted sol (150 g) was added the Sm nitrate solution, drop by drop, while stirring, preparing resultant $Sm_{0.2}Ce_{0.8}O_2$ sol (SDC sol).

EXAMPLE 2

Manufacture of SDC Sol-coated LSM Electrode and Testing of Electrode

A prefabricated YSZ electrolyte disc deposited with LSM electrodes was subjected to dip coating in the SDC sol prepared as in Example 1, forming SDC coating film on the electrode/electrolyte structure. The LSM electrodes were previously fabricated in such a way that the disc-shaped YSZ electrolyte with 25 mm in diameter and 1 mm thickness was coated with the electrodes, followed by calcination at 1100° C. for 2 hrs. The dip coating process was performed for various times between 30 sec and 10 min. It was found that the optimal dip coating time is 1 min.

FIGS. 2a to 2d are scanning electron micrographs (SEM) showing electrode microstructures, the LSM electrode being dip coated with SDC sol, thereby SDC coating film being formed on the electrolyte/electrode structure. As can be seen in FIGS. 2a to 2d, the electrode microstructures according to the invention were formed using a sol-gel coating process by which pores of the electrodes themselves were not filled in (the SDC film does not cover entire surfaces of the electrodes, which is different from those disclosed in JP 06283179 and JP 02038362), whereby diffusion of the reactive gas through the electrodes was not hindered. Comparing the SEM images in FIGS. 2a to 2d, it was seen that the SDC coating film covers the LSM electrode, confirming that the electrode has a microstructure presented as in FIG. 1.

Figure 3A:
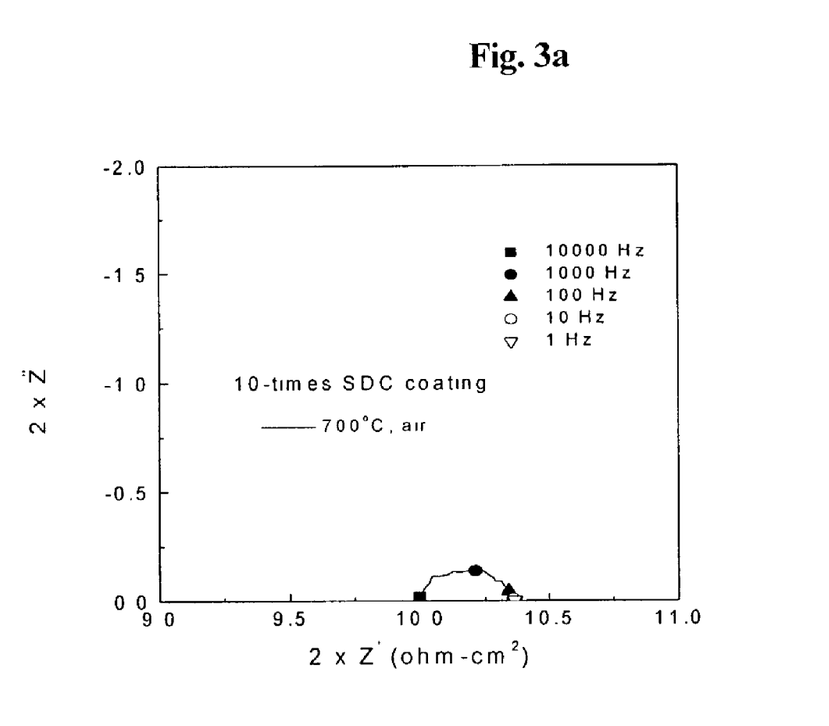
FIGS. 3a to 3b are results of an impedance analysis showing decrease in electrode polarization resistance ($R_{el}$) of a $La_{0.85}Sr_{0.15}MnO_3$ electrode (referred to hereinafter as LSM) coated with samaria-doped ceria (referred to hereinafter as SDC) sol, according to the invention: in which FIG. 3a refers to SDC-coated LSM cathode (700° C.) and FIG. 3b refers to untreated LSM cathode (700° C.)

To analyze performance of the electrodes themselves, a symmetrical cell having electrodes deposited in a symmetric manner over two faces of the electrolyte disc was subjected to impedance analysis. In detail, a sample for electrochemical measurement comprised the electrodes deposited on a 1 $cm^2$ area on two faces of the YSZ disc, that is, the electrolyte. Decrease in the electrode polarization resistance was measured using instruments Solartron 1260 (frequency analyzer) and 1287 (electrochemical interface). FIG. 3a shows a decrease in electrode polarization resistance of the LSM electrode upon SDC coating. Considering that a symmetrical cell was analyzed, the electrode resistance value ($R_{el}$) was calculated in such a way that the value of tangent points of real axis (Z') on the high frequency side of a impedance curve ($R_H$) are subtracted from the value of tangent points of real axis on the low frequency side ($R_L$), followed by division by 2, that is, $R_{el}=(R_L-R_H)/2$.

As shown in FIG. 3a in which the impedance curve of the SDC sol-coated LSM electrode is generated, electrode resistance was as low as less than about 0.2 $\Omega cm^2$, at a low operating temperature of 700° C. and under air atmosphere.

COMPARATIVE EXAMPLE 1

According to a common method in the art, YSZ powder (Tohso, TZ-8YS) and LSM ($La_{0.85}Sr_{0.15}MnO_3$) powder were mixed at a ratio of 50:50 wt %, followed by sintering at 1200° C. for 2 hrs, thereby preparing an electrode.

COMPARATIVE EXAMPLE 2

According to a method analogous to that used in Example 2, a previously formed YSZ electrolyte disc assembled with LSM electrodes was subjected to dip coating in YSZ sol, forming YSZ coating film on the electrode/electrolyte structure. At this time, the electrode/electrolyte structure was formed in such a way, that as in Example 2, $La_{0.85}Sr_{0.15}MnO_3$ (Praxair, USA) powder was coated onto the disc-shaped YSZ electrolyte used in Example 2 at a thickness of 50 to 70 μm, using a tape-casting method, followed by calcination for 2 hrs at 1100° C., whereby interfacial resistance reaction products were not generated.

Figure 3B:
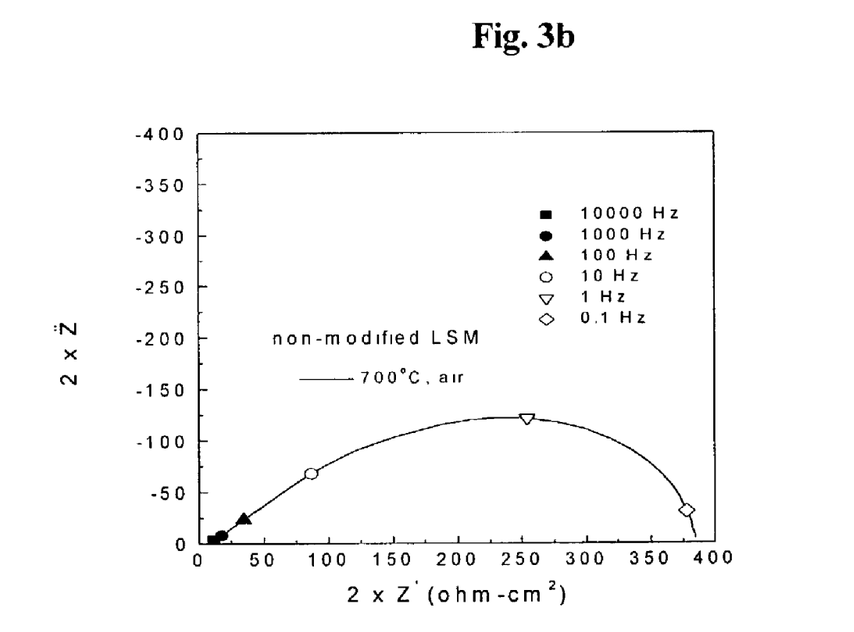

With electrodes manufactured as in Example 2 and Comparative Examples 1 and 2, electrode resistance values were measured. The results are shown in Table 1. In FIG. 3b is shown a decrease in electrode resistance of Comparative Example 1, as revealed in an impedance analysis.

TABLE 1

Comparison of electrode resistance of electrodes manufactured according to various methods

| Samples | Number of coating processes | Electrode Polarization ($R_p$) | Test Condition |
|---|---|---|---|
| LSM powder + YSZ powder | — | 10 $\Omega cm^2$ | 700° C., air atmosphere |
| YSZ sol coating on LSM | 10 | 2.5 $\Omega cm^2$ | 700° C., air atmosphere |
| SDC sol coating on LSM | 10 | 0.12 $\Omega cm^2$ | 700° C., air atmosphere |

As can be seen in Table 1 and FIGS. 3a and 3b, where SDC sol coating was carried out, the electrode performance was greatly increased, compared to the LSM electrode without such coating. Specifically, the electrode manufactured according to the invention exhibited a decrease in electrode resistance of 80 to 1000 times, compared to the electrode according to the common method known in the art, and by more than about 20 times, compared to the YSZ sol coated-electrode. This is because SDC ($SM_{0.2}Ce_{0.8}O_2$) has oxygen ionic conductivity several times higher than that of YSZ.

Figure 4:
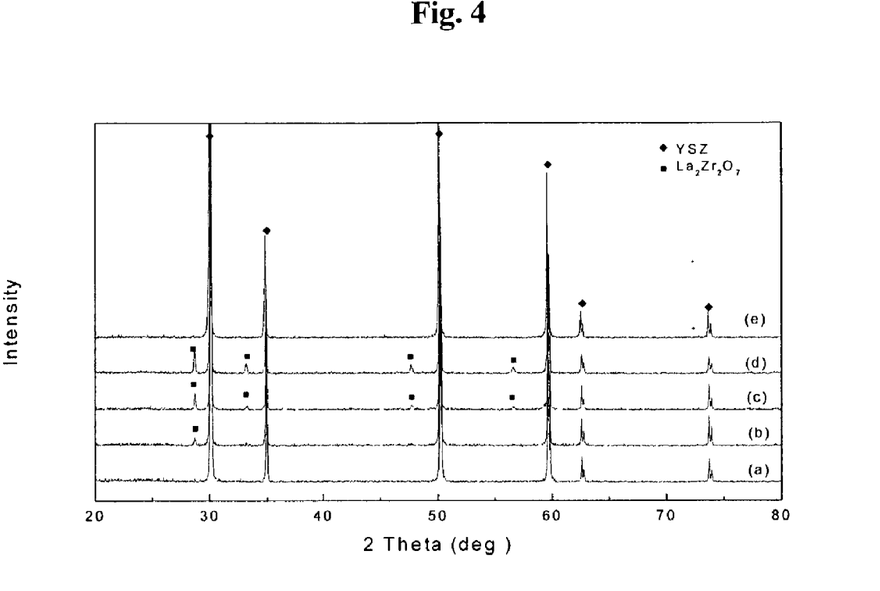
FIG. 4 is a result of an XRD analysis of LSM/electrolyte interface with varying calcination temperatures: in which (a) refers to LSM (1100° C.); (b) refers to LSM (1200° C.); (c) refers to LSM (1300° C.); (d) refers to LSM (1400° C.); and (e) refers to LSM with SDC sol coating (1000° C.), according to the invention and a conventional method.

FIG. 4 shows a result of XRD analysis for the composite electrode manufactured by mixing LSM powder with YSZ powder according to a conventional method, and the electrode manufactured using SDC sol according to the invention. In the case of the conventional composite electrode which was manufactured by mixing materials in a powder state, the electrode has no attaching ability at temperatures below 1200° C., while when the assembling was achieved at high temperatures over 1200° C., $La_2Zr_2O_7$ was generated (FIGS. 4b, 4c and 4d). On the other hand, in the case of the electrode manufactured by coating with SDC sol, no interfacial compounds were detected, due to the lower calcination temperature (below 1000 ° C.) (FIG. 4e). Further, it was found that such an electrode according to the invention plays a role in additionally extending the triple phase boundary where the electrode, electrolyte and oxygen are in contact, thus exhibiting superior electrode performance (FIG. 3).

Figure 5A:
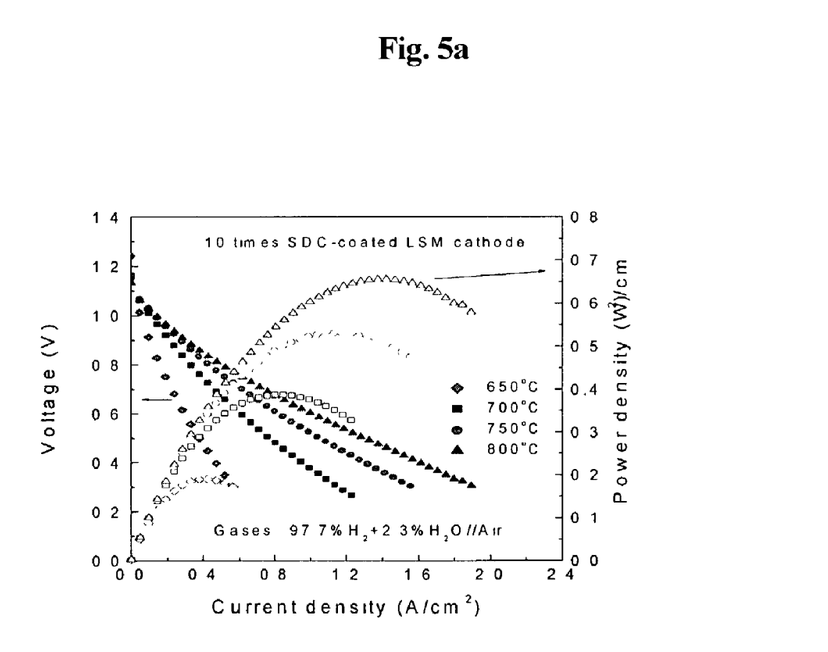
FIGS. 5a and 5b show SOFC single cell performance, with varying temperatures, the cells being deposited with LSM electrodes which are coated with SDC sol according to the invention, and YSZ sol, respectively: in which FIG. 5a refers to SDC-coated LSM cathodes and FIG. 5b refers to YSZ-coated LSM cathodes.
Figure 5B:
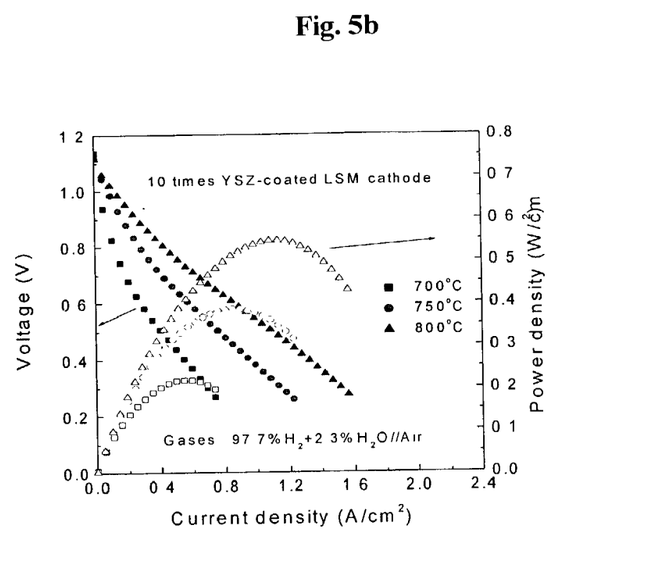

FIGS. 5a and 5b show characteristic I–V curves of cells in which the anode-support cells were coated 10 times with SDC sol (Example 2) and YSZ sol (Comparative Example 2), respectively, at varying temperatures. As can be seen in FIGS. 5a and 5b, the single cell deposited with LSM electrodes, which were coated 10 times with SDC sol at 700° C. and under air atmosphere, exhibited cell performance (0.4 W/cm²) 2 times higher than that of the cell (0.2 W/cm²) deposited with YSZ sol-coated electrodes. As mentioned above, this is because SDC coating film has oxygen ion conductivity several times higher than that of YSZ coating film. Accordingly, it is desirable that a material having high oxygen ion conductivity, for example, SDC, be applied to coat the electrode/electrolyte interface, provided that the electrode microstructure of FIG. 1 is formed under the same conditions.

According to the invention, in place of $La_{0.85}Sr_{0.15}MnO_3$ electrode, Pt, Ag, Au, Rh, Ir, Pd, Ru, $(La_{1-x}Sr_x)MnO_3$, wherein x is 0.5 or less, $(La_{1-x}Ca_x)MnO_3$, wherein x is 0.5 or less, $(La_{1-x}Sr_x)CoO_3$, wherein x is 0.6 or less, and $(La_{1-x}Sr_x)(Co_{1-y}Fe_y)O_3$ wherein x is 0.4 or less and y is 0.8 or less, may be used.

In place of SDC sol used herein, $CeO_2$ polymeric sol or particulate sol being 0 to 30% doped with Gd, Sm, Y, Sr, La or Ca may be used.

EXAMPLE 3

Ni Electrode Testing

Among components of a SOFC, the most unstable component upon sintering at high operating temperatures is the anode material, porous Ni. Ni was coated with SDC sol, followed by thermal treatment at 1000° C. for 3 hrs. After such treatment, the Ni electrode was tested for linear shrinkage and porosity.

The electrode having a microstructure according to the invention is a configuration in which oxygen ion conductive film was formed on the porous electrode, as shown in FIG. 1. This electrode having a microstructure is derived from an opposite conception to that of Virkar et al.'s method (U.S. Pat. No. 5,543,239). According to the Virkar method, the electrocatalyst is placed on the porous electrolyte, thereby extending a triple phase boundary in which an electrochemical reaction occurs. The Virkar method is advantageous in terms of extension of the triple phase boundary when the particles of electrocatalyst or electrode are fine. Despite such an advantage, most of materials for the electrocatalyst or electrode are likely to be sintered at lower temperatures, compared to YSZ used for the electrolyte. As a result, such fine particles are sintered at higher temperatures, resulting in loss of electron conductivity (U.S. Pat. No. 5,543,239, 6, 10–12).

Unlike the Virkar method, the invention is directed to a method by which the oxygen ion conductor, SDC (samaria doped ceria) film coats the electrocatalyst and electrode which is likely to be sintered. Since SDC is a difficult material to sinter, compared to the electrocatalyst or electrode material, there is an advantage in that it can prevent the electrode material from being sintered at high temperatures.

Tests were performed to determine linear shrinkage and porosity of the Ni electrodes coated with varying amounts of SDC according to the present invention. The measurements are shown in Table 2.

TABLE 2

Changes in linear shrinkage and porosity of the Ni electrodes

| Amount coated (SDC wt %) | Linear shrinkage (%) | Porosity (%) |
|---|---|---|
| 0 | 28.7 | 27.2 |
| 1.5 | 2.6 | 77.8 |
| 4.0 | 3.2 | 76.5 |
| 7.1 | 3.1 | 74.8 |
| 10.0 | 4.3 | 72.7 |
| 12.1 | 4.5 | 71.6 |
| 13.5 | 4.7 | 70.7 |

As shown in Table 2, the Ni electrode not coated with SDC sol exhibited a high linear shrinkage of 28% and porosity of 27%, after thermal treatment at 1000° C. This represents a great decrease in the electrode's porosity of 78 to 82% (not shown) before thermal treatment. However, SDC sol-coated electrodes exhibited a low linear shrinkage of less than 5% and porosity of 70 to 78% depending on the coated amounts of SDC. Thus, there was little decrease in porosity, compared to the uncoated electrode's initial porosity of 78 to 82% before thermal treatment.

These results demonstrate that, as mentioned above, the coating of SDC film on the electrodes greatly increases electrochemical performance of the electrodes, and additionally controls sintering of the electrodes.

EXAMPLE 4

Cell Performance Testing

To determine degree of improvement in cell performance in a single cell according to degree of electrode performance, SDC sol of Example 1 was applied to coat an anode-supported SOFC cell in which LSM cathodes were deposited, using a method analogous as in Example 2. As for the anode-supported cell, the thickness of the 8 mole % YSZ electrolyte was approximately 30 μm, and the anode thickness was approximately 1 mm.

Figure 6:
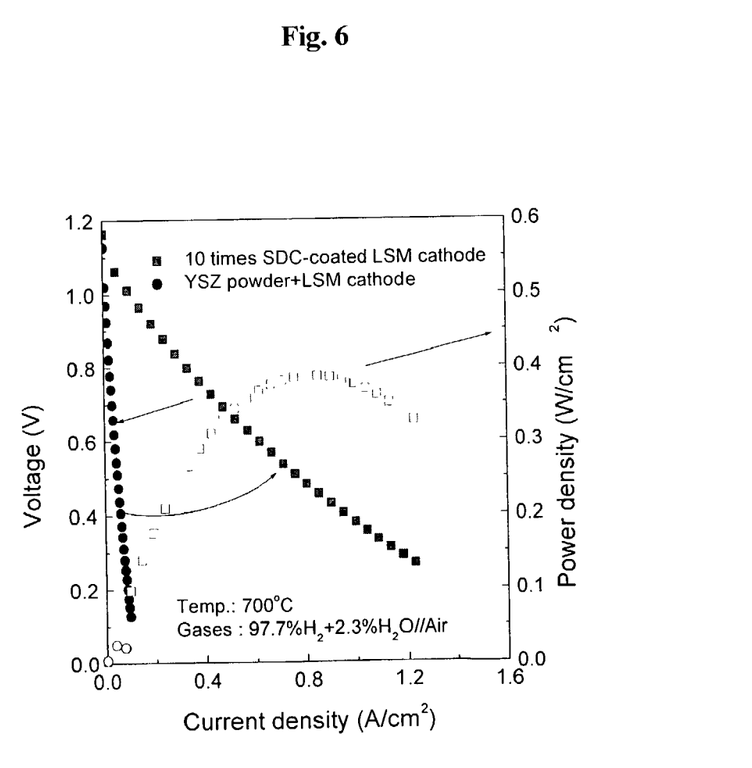
FIG. 6 shows cell performance of a SOFC single cell deposited with SDC sol-coated LSM electrodes according to the invention and cell performance of a SOFC single cell deposited with electrodes manufactured by mixing YSZ and LSM powders according to a conventional method.

FIG. 6 shows an I–V curve of a cell deposited with the cathodes manufactured by coating 10 times with SDC sol, which is compared to a cell deposited with the cathodes manufactured using a conventional method. A power density obtained at temperatures below 700° C. was similar in level to that of SOFC operated at the conventional temperature of 1000° C. In particular, as for the cell deposited with LSM electrodes which were coated 10 times with SDC sol, cell performance at 700° C. and 800° C. under air atmosphere, exhibited as high as approximately 0.4 W/cm$^2$ and 0.7 W/cm$^2$, respectively. That is, performance of cells deposited with the cathodes having the electrode having a microstructure as in the invention showed power density about 15 times higher than that of cell performance deposited with an average grade of cathodes manufactured according to a conventional method.

As shown in the above, with application of SDC sol, SDC coating film was formed on the electrode/electrolyte structures of prefabricated conventional solid state electrochemical devices, and the like. As a result, interfacial reaction products were not generated at the electrode-electrolyte interface, and contact resistance was decreased. Further, such coating process offers an additional extension of a triple phase boundary where an electrode reaction occurs, thereby enabling conventional electrodes to exert highly increased performance.

Therefore, compared to conventional methods for manufacturing electrodes in which the electrode and electrolyte powders are mixed to form interpenetrating networks, the invention could solve problems of generation of interfacial reaction products and interconnection cut-off, in a simple and economical manner. In addition, the invention extends electrochemical reaction area, owing to extension of the triple phase boundary, and so improves the performance of electrodes for conventional SOFCs and sensors significantly. Specially, given that electrode structure is improved to have a new microstructure configuration presented in the invention, low temperature SOFCs and sensors which operate at 650 to 800° C. can be fabricated.

As apparent from the above description, the present invention provides a novel electrode having a microstructure of extended triple phase boundary. For the electrode of the invention, porous ion conductive ceramic ceria film was formed on the electrode and electrolyte, thereby the electrode having a microstructure of an extended triple phase boundary where the electrode/electrolyte/gas are in contact. As a result, the electron conductive path and ion conductive path are independently and continuously maintained, thereby increasing cell performance and solving a interconnection cut-off problem which is present in conventionally manufactured electrodes. In addition, using a sol-gel method which enables manufacture of the electrode at lower temperatures, electrodes can be modified at lower temperatures, thereby preventing formation of undesired interfacial reaction products.

Further, the electrode of the invention does not require high cost equipment or starting materials, owing to the sol-gel method by which low temperature processes are possible. According to the invention, the electrode microstructure can be controlled in an easy manner, realizing economic benefits, and the electrode/electrolyte interfacial resistance and electrode resistance can be effectively decreased.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An electrode having a microstructure of extended triple phase boundary with porous ion conductive ceria film coating wherein:
    an electrode for solid oxide fuel cells, sensors, or solid state devices, which is prefabricated to have independent electron and ion conductive paths, is coated with a porous oxygen ion conductive ceramic ceria film to provide a microstructure having an extended triple phase boundary where the electrode/electrolyte/gas are in contact;
    the electrode has a skeleton made of a material exhibiting electron conductivity or mixed conductivity;
    the coated film is made of a material exhibiting ion conductivity or mixed conductivity while continuously surrounding the electrode without any gap and without disconnecting the ion conductive path from a surface of the electrolyte;
    the coated film forms gas-permeable pores or fine pores therein or at an interface thereof with the electrode to provide the triple phase boundary; and
    wherein the porous oxygen ion conductive ceramic ceria film is made from one or more oxide sols selected from the group consisting of $CeO_2$ polymeric sol or particulate sol doped with up to 30% Gd, $CeO_2$ polymeric sol or particulate sol doped with Sm up to 30%, $CeO_2$ polymeric sol or particulate sol doped with Y up to 30%, $CeO_2$ polymeric sol or particulate sol doped with Sr up to 30%, $CeO_2$ polymeric sol or particulate sol doped with La up to 30%, and $CeO_2$ polymeric sol or particulate sol doped with Ca up to 30%.

2. The electrode as set forth in claim 1, wherein the electron conductive material of the electrode (1) is one or more metal or oxides selected from the group consisting of Pt, Ag, Au, Rh, Ir, Pd, Ru, $(La_{1-x}Sr_x)MnO_3$ in which x is 0.5 or less, $(La_{1-x}Ca_x)MnO3$ in which x is 0.5 or less, $(La_{1-x}Sr_x)CoO_3$ in which x is 0.6 or less, and $(La_{1-x}Sr_x)(Co_{1-y}Fe_y)O_3$ in which x is 0.4 or less and y is 0.8 or less.

3. A method for manufacturing an electrode/electrolyte structure having a continuous porous ion conductive ceramic ceria film and a microstructure of extended triple phase boundary where the electrode, electrolyte and gas are in contact, comprising:
    (a) coating a surface of a dense electrolyte (2) with an electrode (1) made of an electron conductive material, followed by sintering and attaching, and thus preparing an electrode/electrolyte structure;
    (b) preparing an ion conductive ceramic ceria polymeric sol or particulate sol; and (c) dip-coating with ceria polymeric sol or particulate sol of the step (b) on the electrode/electrolyte structure of the step (a), using a sol-gel method, thereby forming a continuous porous ion conductive ceramic ceria film (3), wherein the porous oxygen ion conductive ceramic ceria polymeric sol or particulate sol is made of one or more selected from the group consisting of $CeO_2$ polymeric sol or particulate sol doped with 0 to 30% Gd, $CeO_2$ polymeric sol or particulate sol doped with 0 to 30% Sm, $CeO_2$ polymeric sol or particulate sol doped with 0 to 30% Y, $CeO_2$ polymeric sol or particulate sol doped with 0 to 30% Sr, $CeO_2$ polymeric sol or particulate sol doped with 0 to 30% La, and $CeO_2$ polymeric sol or particulate sol doped with 0 to 30% Ca.

4. The method as set forth in claim 3, wherein the electron conductive material of the electrode (1) is one or more metal or oxides selected from the group consisting of Pt, Ag, Au, Rh, Ir, Pd, Ru, $(La_{1-x}Sr_x)MnO_3$ in which x is 0.5 or less, $(La_{1-x}Ca_x)MnO_3$ in which x is 0.5 or less, $(La_{1-x}Sr_x)CoO_3$ in which x is 0.6 or less, and $(La_{1-x}Sr_x)(Co_{1-y}Fe_y)O_3$ in which x is 0.4 or less and y is 0.8 or less.

5. An electrode construction used for solid oxide fuel cells, sensors, or solid state devices comprising:

an electrode (1) made of an electron conductive material, an electrolyte (2) made of an ion conductive material, and a coated porous oxygen ion conductive ceramic ceria film (3) surrounding the electrode and electrolyte, wherein the porous oxygen ion conductive ceramic ceria film is made of one or more oxide sol selected from the group consisting of $CeO_2$ polymeric sol or particulate sol doped with 0 to 30% Gd, $CeO_2$ polymeric sol or particulate sol doped with 0 to 30% Sm, $CeO_2$ polymeric sol or particulate sol doped with 0 to 30% Y, $CeO_2$ polymeric sol or particulate sol doped with 0 to 30% Sr, $CeO_2$ polymeric sol or particulate sol doped with 0 to 30% La, and $CeO_2$ polymeric sol or particulate sol doped with 0 to 30% Ca;

the porous oxygen ion conductive ceramic ceria film forms gas-permeable fine pores (4) therein;

the coated film provides a microstructure of extended triple phase boundary where the electrode, electrolyte and gas are in contact; and the coated film is connected continuously without gaps.

6. The electrode construction as set forth in claim 5, wherein the electron conductive material of the electrode 1 is one or more metal or oxides selected from the group consisting of Pt, Ag, Au, Rh, Ir, Pd, Ru, $(La_{1-x}Sr_x)MnO_3$ in which x is 0.5 or less, $(La_{1-x}Ca_x)MnO_3$ in which x is 0.5 or less, $(La_{1-x}Sr_x)CoO_3$ in which x is 0.6 or less, and $(La_{1-x}Sr_x)(Co_{1-y}Fe_y)O_3$ in which x is 0.4 or less and y is 0.8 or less.

7. The electrode construction of claim 1, wherein said electrode consists essentially of said electron conductive material and said coated porous oxygen ion conductive ceramic ceria film.

8. The electrode construction of claim 5, wherein said electrode consists essentially of said electron conductive material and said coated porous oxygen ion conductive ceramic ceria film surrounding the electrode.

* * * * *